United States Patent Office 3,108,090
Patented Oct. 22, 1963

3,108,090
POLYMERIC COMPOSITIONS STABILIZED
AGAINST HEAT, AGEING AND LIGHT
Giuseppe Leandri, Poggio Franco, Bari, Italy, assignor to
Montecatini, Societa Generale per l'Industria Mineraria
e Chimica, Milan, Italy, a corporation of Italy
No Drawing. Filed June 9, 1961, Ser. No. 115,889
Claims priority, application Italy June 13, 1960
8 Claims. (Cl. 260—45.7)

The present invention relates to stabilized polymeric compositions of crystalline poly-alpha-olefins and to a process for stabilizing fibres, films and other manufactured articles made from such crystalline olefin polymers.

It is well known that crystalline polyolefin materials undergo a certain undesirable degradation during hot processing in the presence of atmospheric oxygen. It is also known that manufactured articles made from crystalline polyolefins are sensitive to the action of light and/or to thermal treatment.

This degradation action can be reduced by the addition of various protective substances to the polymer, this addition being conveniently carried out during the preparation of fibres, films, etc., from the polymer. Heretofore such protective substances have included small amounts of phenols, amines, sulfur compounds, amino-phenols, mercaptans, organo-tin compounds, phosphites, and such other compounds as, e.g., 2,6-tertiary butyl-p-cresol, β-naphthylamine, p-phenylene diamine, styrenated phenols, 2,5-ditertiary butyl-hydroquinone, 2-octyl-4-methoxybenzophenone, 4,4'-thiobis-3-methyl-6-tertiary butyl phenol, 2,2'-methylene bis-4-ethyl-6-tertiary butylphenol, 4,4'-isopropylidene phenol, phenyl-α-naphthyl amine, phenyl-β-naphthylamine, polytrimethyldihydroquinoline, methyl ethyl ketoxime, cyclohexanone oxime, paraquinonedioxime, N,N'-diphenylethylene diamine, diphenyl-p-phenylene diamine, basic zinc dialkyldithiophosphates, tris nonylphenylphosphite, nickel butyldithiocarbamate, and the like.

I have surprisingly found that a compound having the general formula:

R—SO₂—O—R' wherein R and R' are either aryl or substituted aryl wherein the substituents may be alkyl, alkoxy, acyl or hydroxyl groups or a C₆H₅SO₂O radical exhibits a high degree of stabilizing action against the action of heat, ageing, and light, when such compound is mixed in an amount up to 2% by weight based on the crystalline olefin polymer used to make the desired fibre, film, or the like.

Such compounds also function as stabilizers for compositions made from polyolefins and basic nitrogen compounds e.g., polyalkyleneimines (copending application Serial No. 702,430, filed December 12, 1957), condensation products of dichloroethane with polyfunctional amines (copending application Serial No. 83,141, filed January 17, 1961, polyalkyleneimines plus a dispersant (copending application Serial No. 8,529, filed February 15, 1960, condensation products of epichlorohydrin with primary amines (copending application Serial No. 30,732, filed May 23, 1960, polyvinylpyridines (copending application Serial No. 46,391, filed August 1, 1960, which compositions may be used to produce textile fibres having improved tinctorial characteristics.

The present invention therefore concerns the production of polymeric compositions that are stable against the action of heat, ageing, and light and which comprise a crystalline polyolefin and an organic stabilizing compound of the general formula:

R—SO₂—O—R' wherein R and R' are as previously defined.

In a more specific embodiment, the present invention contemplates a process for stabilizing crystalline polyolefins, more particularly polypropylene, against the action of heat, ageing, and light, this process consisting of adding to the polyolefin from 0.02% to 2% by weight of the polyolefin and (preferably about 0.2%) of a compound having the general formula

R—SO₂—O—R' wherein R and R' are as previously defined.

Among the compounds which can be used as stabilizers for crystalline polyolefins according to the present invention, the following compounds appear to be particularly effective:

(1) 3-hydroxyphenyl ester of benzensulfonic acid

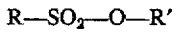

(2) Phenyl ester of alpha-naphthylene sulfonic acid

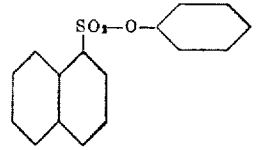

(3) Hydroquinone di-benzosulfonate

The stabilizing compound may be added to the polyolefin by mixing the two compounds together with agitation. The stabilizer can, of course, also be added by other methods, such as by mixing the polyolefin with a solution of the stabilizer in a suitable solvent and then evaporating off the solvent, by adding the stabilizer to the polyolefin at the end of the olefin polymerization, etc.

It is also possible to obtain satisfactory stabilizing action by applying the stabilizing compound directly onto the final manufactured article, e.g., by immersing such article in a stabilizer solution or dispersion and then evaporating the solvent or dispersant.

The stabilizing compounds of the present invention exhibit good compatibility with polyolefins in the molten state and do not cause any staining.

I have also found that the addition of an anti-acid agent, namely, an inorganic salt of stearic acid, e.g., calcium stearate, to the compositions of the present invention before spinning improves the stability characteristics of such same compositions.

The following examples will further illustrate the invention. All parts are by weight unless otherwise stated. The polymers used in these examples exhibit crystallinity due to the presence of the isotactic structure.

*Example 1*

In a Werner-type mixer a homogeneous mixture is prepared at room temperature from 9.95 kg. of polypropylene (prepared with the aid of stereospecific catalysts such as, e.g., those on the basis of an alkyl aluminum derivative and a crystalline transition metal halide, and having an intrinsic viscosity [η], determined in tetrahydronaphthalene at 135° C., of 1.5, a residue after heptane extraction of 95.1%, and an ash content of 0.042%) and 50 g. of 3-hydroxy-phenyl ester of benzene sulfonic acid C₆H₅—SO₂—O—C₆H₄—(m)OH The polymer-stabilizer mixture is melted in a test tube kept in a thermostatic bath at 250° C. for 10 minutes. There results an almost colorless molten mass.

The mix is spun in a melt spinning device under the following conditions:

| | |
|---|---|
| Screw temperature | 250° C. |
| Head temperature | 240° C. |
| Spinneret temperature | 230° C. |
| Spinneret type | 60/0.8 x 16 mm. |
| Maximum pressure | 30 kg./cm.² |
| Winding speed | 240 meters/minute. |

The fibres are stretched with a stretching ratio of 1:5 at 130° C. The characteristics of the fibers obtained are as follows:

| | |
|---|---|
| Tenacity | g./den__ 5.9 |
| Elongation | percent__ 22 |

The intrinsic viscosity [η] of the stabilized yarn is 1.38, while a yarn obtained from the same polymer but without the stabilizer has an intrinsic viscosity [η] of 1.10.

The stabilized yarn, exposed for 15 hours to the action of heat in an oven provided with air circulation at 120° C, remains virtually unaltered in its characteristics while the non-stabilized yarn after the same text present a residual tenacity of 92%. After exposure to an ultraviolet mercury lamp the stabilized yarn maintains 28% of its initial tenacity while in the non-stabilized yarn the tenacity is reduced to 12% of the initial value.

*Example 2*

In a Werner-type mixer a homogeneous mixture is prepared at room temperature from 9.95 kg. of polypropylene prepared with stereospecific catalysts and having an intrinsic viscosity of 1.65 (determined in tetrahydronaphthalene at 135° C.), a residue from heptane extraction of 94.8% and an ash content of 0.052%, and 50 g. of phenyl ester of alphanaphthalene sulfonic acid

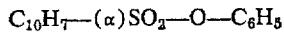

$$C_{10}H_7-(\alpha)SO_2-O-C_6H_5$$

The polymer-stabilizer mix is melted in a test tube kept in a thermostatic bath at 250° C. for 10 minutes to provide a virtually colorless molten mass. The mix is spun in a melt spinning device under the following conditions:

| | |
|---|---|
| Screw temperature | 200° C. |
| Head temperature | 190° C. |
| Spinneret temperature | 195° C. |
| Spinneret type | 60/0.8 x 16 mm. |
| Maximum pressure | 50 kg./cm.² |
| Winding speed | 240 meters/minute. |

The fibres are stretched with a stretching ratio of 1:5 at 130° C. The characteristics of the yarn obtained are:

| | |
|---|---|
| Tenacity | g./den__ 4.1 |
| Elongation | percent__ 19 |

The intrinsic viscosity [η] of the stabilized yarn is 1.29 while that of the yarn obtained from the same polymer without addition of the stabilizer is 1.21. The stabilized yarn, when exposed for 15 hours to the action of heat in an oven provided with air circulation at 120° C., remains practically unaltered in its characteristics while the non-stabilized yarn after the same test present a residual tenacity of 87%. After exposure to an ultraviolet mercury lamp for 20 hours the stabilized yarn maintains 38% of its initial tenacity, whereas the non-stabilized yarn retains only 31% of its initial tenacity.

*Example 3*

In a Werner-type mixer a homogeneous mix is prepared at room temperature from 9.95 kg. of polypropylene prepared with the aid of stereospecific catalysts and having an intrinsic viscosity of 1.5 (determined in tetrahydronaphthalene at 135° C.), a residue after heptane extraction of 95.1%, and an ash content of 0.042°, and 50 g. of hydroquinonebenzosulfonate

$$(C_6H_5-SO_2-O-C_6H_4-O-SO_2-C_6H_5).$$

The mix is spun in a melt spinning device under the following conditions:

| | |
|---|---|
| Screw temperature | 250° C. |
| Head temperature | 240° C. |
| Spinneret temperature | 230° C. |
| Spinneret type | 60/0.8 x 16 mm. |
| Maximum pressure | 30 kg./cm.² |
| Winding speed | 300 meters/minute. |

The fiber is stretched with a stretching ratio of 1:4.5 at 130° C. The characteristics of the fibre obtained are:

| | |
|---|---|
| Tenacity | g./den__ 4.46 |
| Elongation | percent__ 24.7 |

The intrinsic viscosity [η] of the stabilized yarn is 1.26 while that of the polymer obtained from the same monomer without the addition of the stabilizer is 1.10. The stabilized yarn, when exposed for 15 hours to the action of heat in an oven provided with air circulation at 120° C., remains essentially unaltered in its characteristics while the non-stabilized yarn after the same test present a residual tenacity of 86%. After exposure to an ultraviolet mercury lamp for 20 hours the stabilized yarn maintains 27% of its initial tenacity, whereas the tenacity of the non-stabilized yarn is reduced to 12% of the initial value.

Variations can of course be made without departing from the spirit of my invention.

Having thus described the invention, what I desire to secure and claim by Letters Patent is:

1. A polymeric composition that is stable against the action of heat, aging and light comprising a crystalline polypropylene obtained with the aid of a stereospecific catalysts and showing isotactic structure and a stabilizer having the general formula:

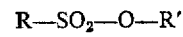

$$R-SO_2-O-R'$$

wherein R and R' are each selected from the group consisting of aryl and substituted aryl wherein the substituents are selected from the group consisting of alkyl, alkoxy, acyl, hydroxy, and the radical $C_6H_5SO_2-O-$.

2. The polymeric composition of claim 1 wherein the amount of stabilizer is from 0.02 to 2% by weight of the polypropylene.

3. The polymeric composition of claim 1 wherein the stabilizer is the 3-hydroxy-phenyl ester of benzene-sulfonic acid,

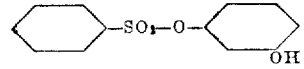

4. The polymeric composition of claim 1 wherein the stabilizer is the phenyl ester of alphanaphthalene sulfonic acid,

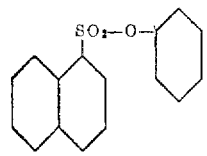

5. The polymeric composition of claim 1 wherein the stabilizer is hydroquinone dibenzosulfonate,

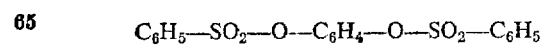

$$C_6H_5-SO_2-O-C_6H_4-O-SO_2-C_6H_5$$

6. The composition of claim 1 in filamentary form.
7. The composition of claim 1 in fibre form.
8. The composition of claim 1 in film form.

References Cited in the file of this patent
UNITED STATES PATENTS

| 2,887,466 | Lappin et al. | May 19, 1959 |
| 2,985,617 | Salyer et al. | May 23, 1961 |

UNITED STATES PATENT OFFICE
CERTIFICATE OF CORRECTION

Patent No. 3,108,090            October 22, 1963

Giuseppe Leandri

It is hereby certified that error appears in the above numbered patent requiring correction and that the said Letters Patent should read as corrected below.

Column 2, line 18, the structural formula should appear as shown below instead of as in the patent:

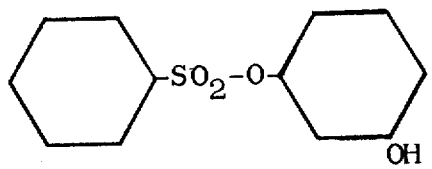

column 3, line 22, for "text" read -- test --; line 72, for "0.042°" read -- 0.042% --; column 4, line 29, for "Leters" read -- Letters --; line 33, for "of a stereospecific" read -- of stereospecific --.

Signed and sealed this 12th day of May 1964.

(SEAL)
Attest:

ERNEST W. SWIDER
Attesting Officer

EDWARD J. BRENNER
Commissioner of Patents